July 2, 1935.  T. D. LAZARIDES  2,006,957
VEHICLE BODY CONSTRUCTION HAVING REMOVABLE POSTS
Filed Aug. 26, 1933  6 Sheets-Sheet 1
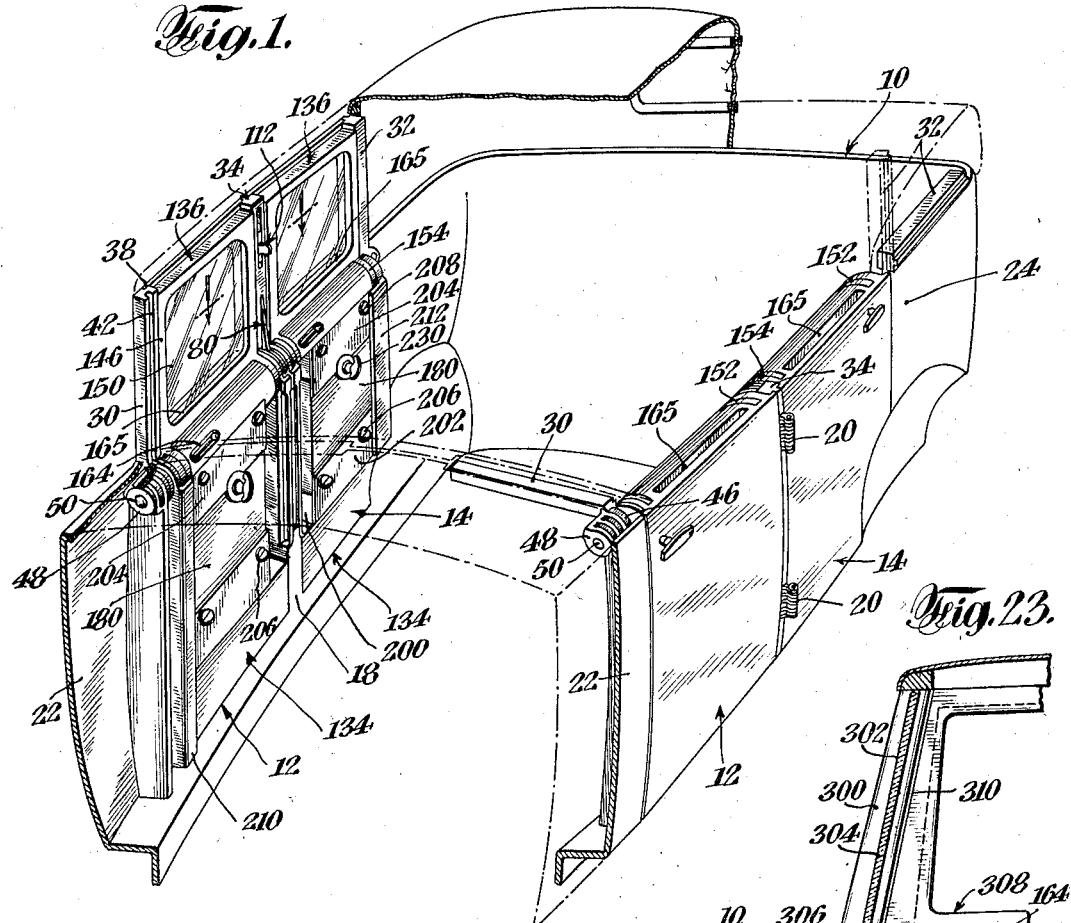
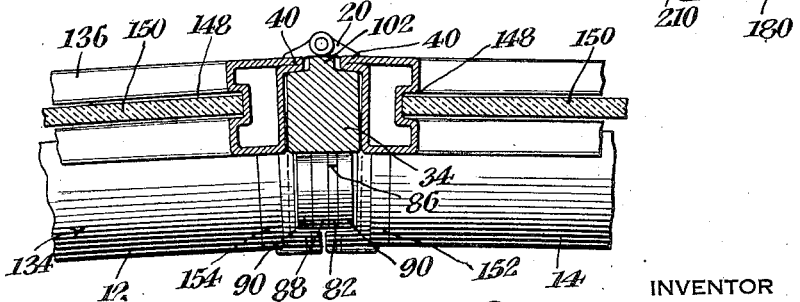
INVENTOR
Thrasybule D. Lazarides
BY
Prindle Bean & Mann
ATTORNEYS

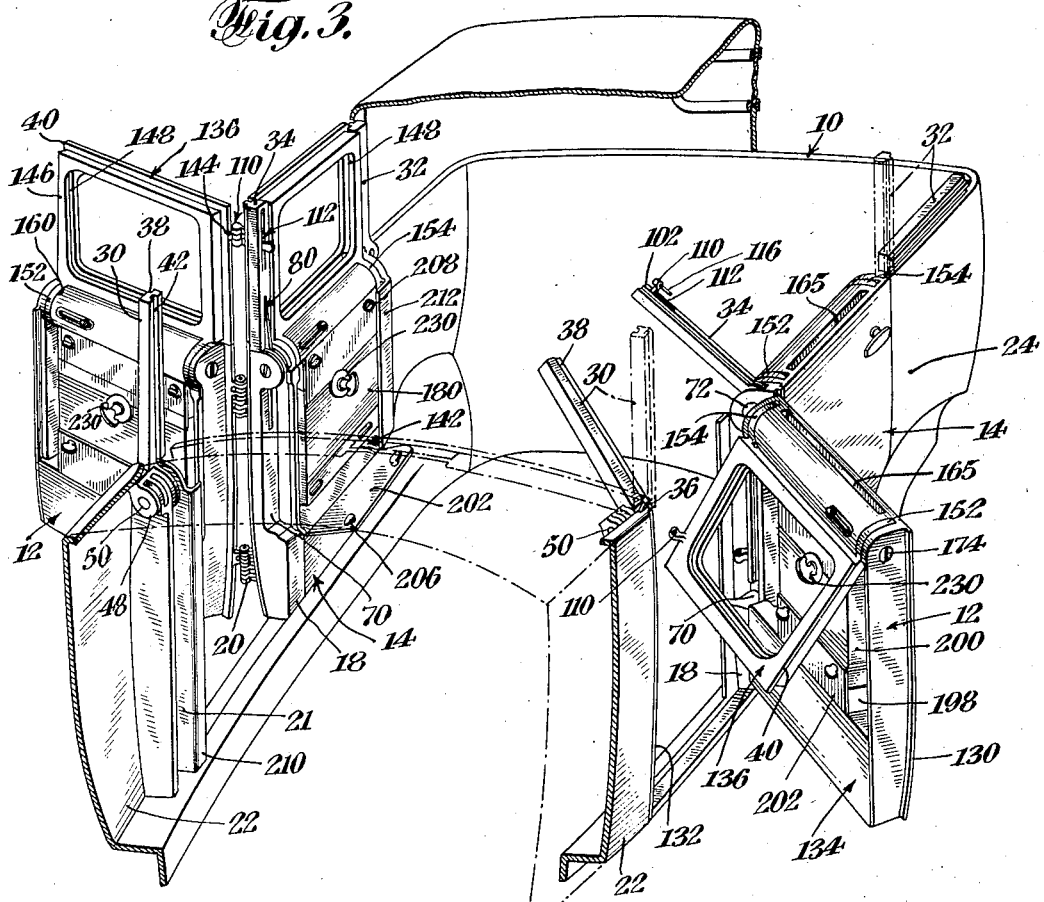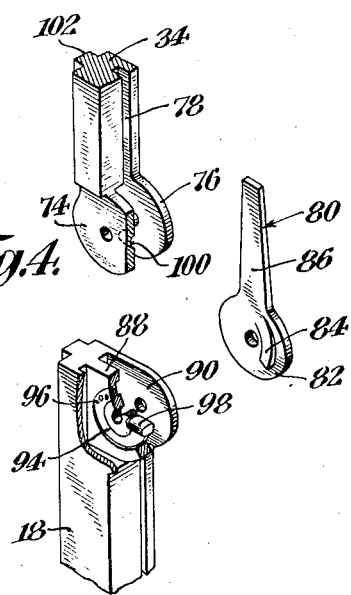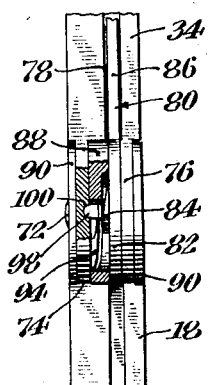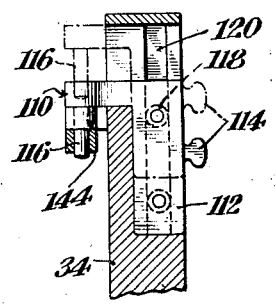

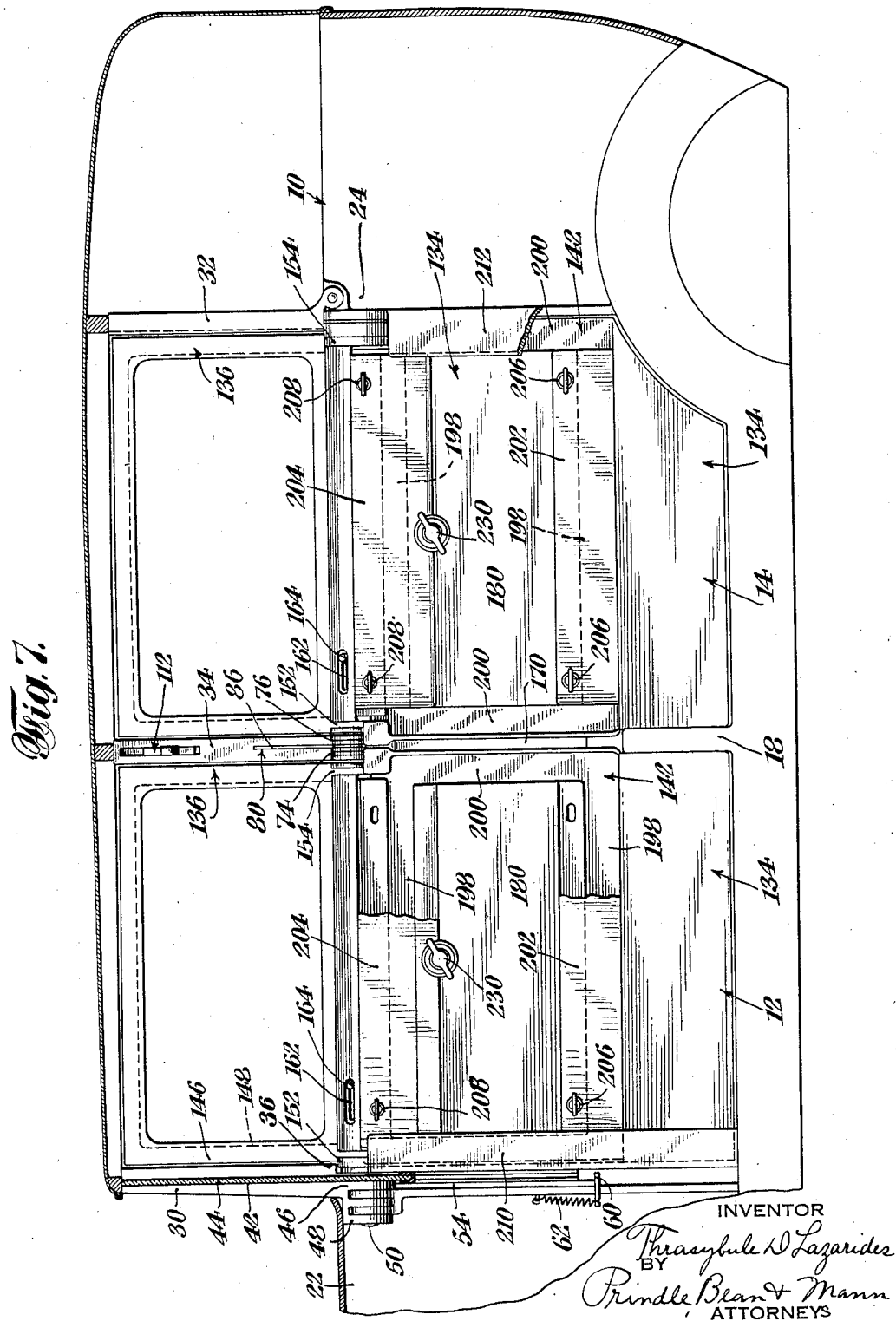

July 2, 1935. T. D. LAZARIDES 2,006,957
VEHICLE BODY CONSTRUCTION HAVING REMOVABLE POSTS
Filed Aug. 26, 1933   6 Sheets-Sheet 4
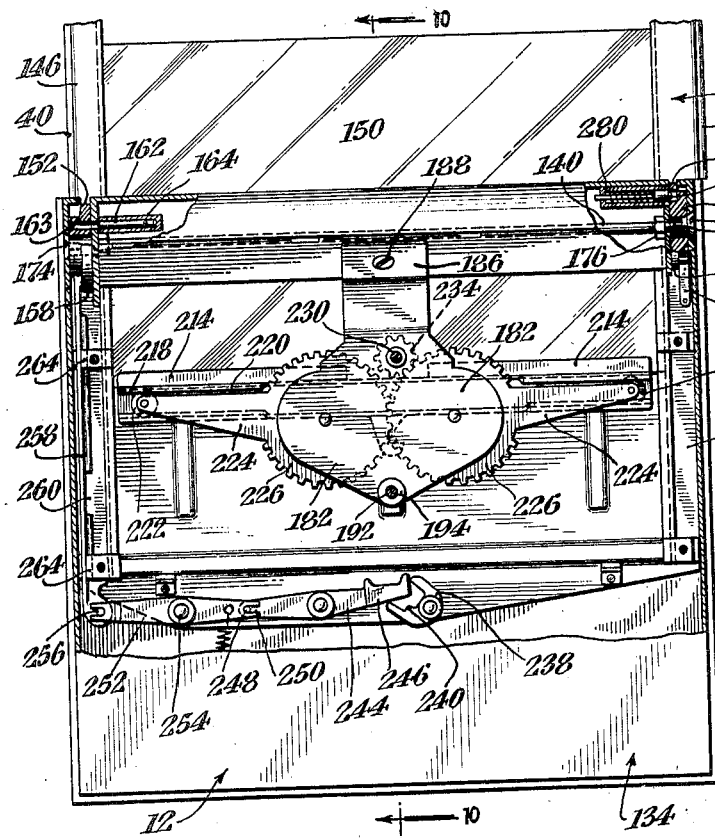
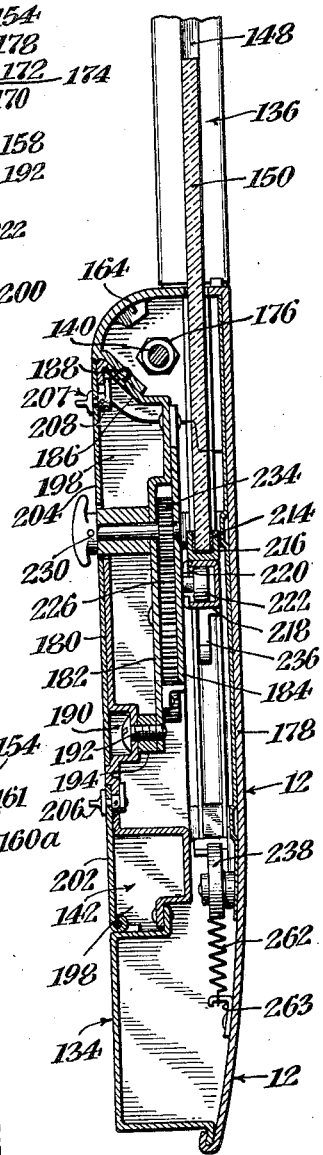
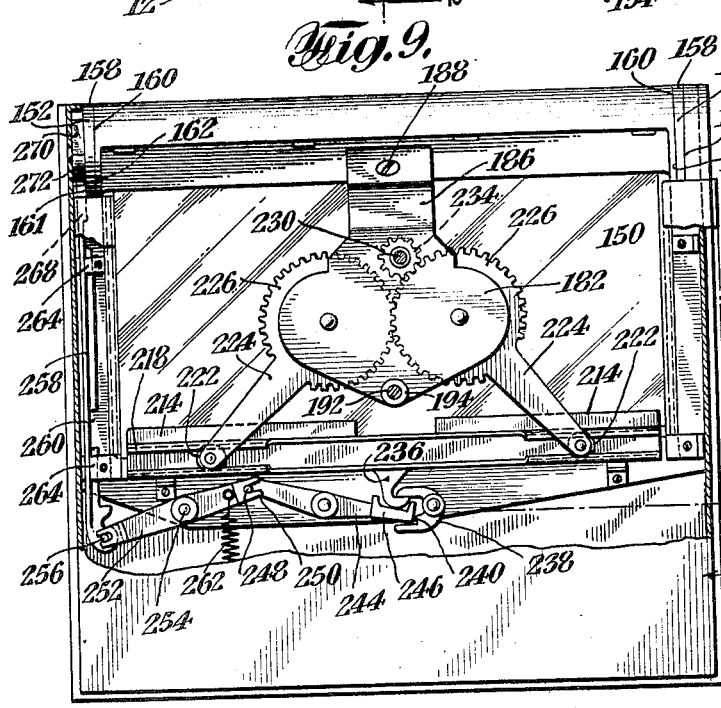
INVENTOR
Thrasybule D. Lazarides
BY Prindle, Bean & Mann
ATTORNEYS

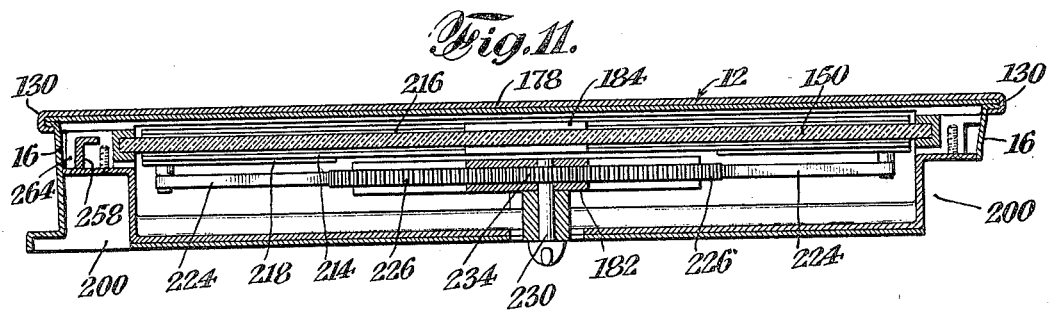
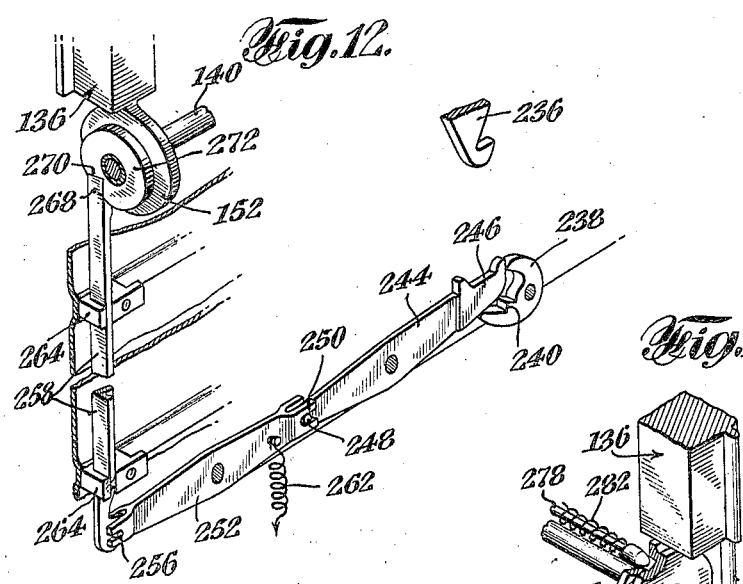
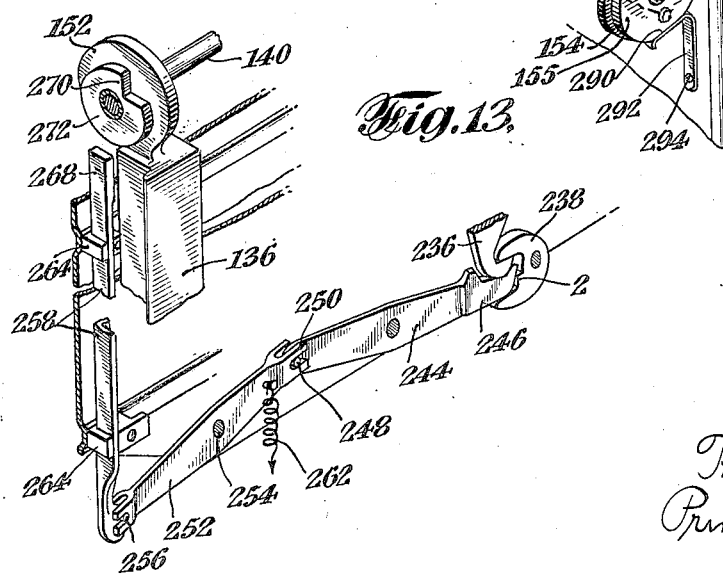
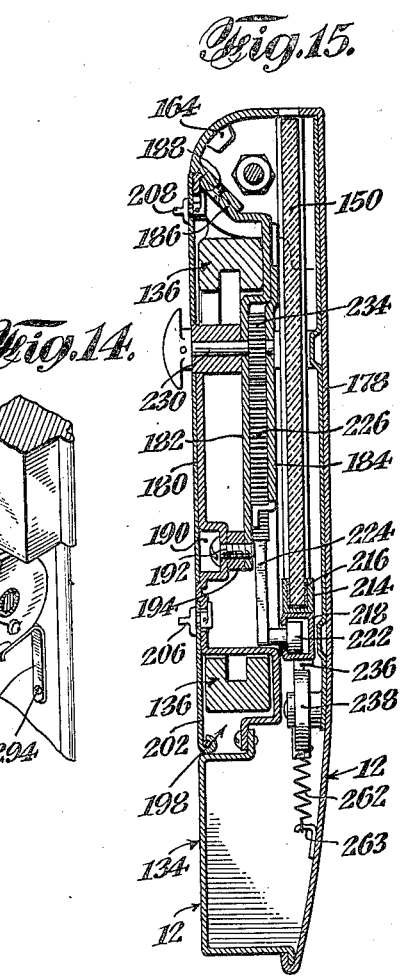

July 2, 1935.     T. D. LAZARIDES     2,006,957
VEHICLE BODY CONSTRUCTION HAVING REMOVABLE POSTS
Filed Aug. 26, 1933     6 Sheets-Sheet 6

INVENTOR
Thrasybule D. Lazarides
BY
Prindle, Bean & Mann
ATTORNEYS

Patented July 2, 1935

2,006,957

UNITED STATES PATENT OFFICE 2,006,957

VEHICLE BODY CONSTRUCTION HAVING REMOVABLE POSTS

Thrasybule D. Lazarides, New York, N. Y.

Application August 26, 1933, Serial No. 686,869

14 Claims. (Cl. 296—45)

This invention relates to vehicle body constructions having pivoted stanchions and a third hinge on one of said stanchions.

One object of my invention is the provision of a vehicle body construction having an intermediate stanchion provided with a movable hinge part.

Another object of my invention is the provision of a vehicle having pivoted stanchions for the windshield so that when the windshield is lowered, the stanchions can be moved out of sight. The windshield may be vertical or slanting. In this construction the instruments from the instrument board are placed on the steering wheel which is provided with a chamber for the instruments. The spider of the steering wheel is formed to receive the instrument set.

To the accomplishment of the foregoing, and such other objects as may hereinafter appear, this invention comprises the construction, combination and arrangement of parts hereinafter described and then sought to be defined in the appended claims, reference being had to the accompanying drawings forming a part hereof, and which show merely for the purpose of illustrative disclosure, a preferred embodiment and a modified embodiment of my invention, it being expressly understood, however, that various changes may be made in practice within the scope of the claims without digressing from my inventive idea.

In the drawings:

Fig. 1 represents a perspective view of a vehicle body construction with parts broken away.

Fig. 2 represents a transverse horizonal cross section taken substantially on line 2—2 of Fig. 1.

Fig. 3 represents a perspective view of a vehicle body with certain of the doors open.

Fig. 4 represents an exploded view showing the locking means for the middle pivoted post.

Fig. 5 represents a detail showing the locking means in locked position.

Fig. 6 represents a detail showing the movable hinge.

Fig. 7 represents an interior plan view of one side of the vehicle body with the sash frames in raised position and with the doors closed.

Fig. 8 represents an interior plan view of a door showing the window raising and lowering mechanism.

Fig. 9 is a view similar to Fig. 8 showing the window in lowered position.

Fig. 10 represents a vertical transverse cross section taken substantially on line 10—10 of Fig. 8.

Fig. 11 represents a horizontal transverse cross section through a door.

Fig. 12 is a detail showing means for locking the sash frame when the window is in raised position, Fig. 13 is similar to the showing in Fig. 12 with the sash frame in unlocked and lowered position.

Fig. 14 represents a detail for holding the sash frame in raised position.

Fig. 15 represents a transverse vertical cross section with the sash frame and window lowered.

Fig. 16 represents a plan view of the windshield construction showing means for locking the posts in raised position when the window is in raised position.

Fig. 17 represents a detail of the locking means for the windshield posts.

Fig. 18 represents an exploded view showing the hinge construction for the windshield posts.

Fig. 19 represents a detail showing the windshield in lowered position.

Fig. 20 represents a transverse vertical cross section taken substantially on line 20—20 of Fig. 19.

Fig. 21 represents a horizontal longitudinal cross section taken substantially on line 21—21 of Fig. 17;

Fig. 22 represents a partial horizontal transverse view of the windshield construction, and Fig. 23 represents a partial elevation of another form of body in which the windshield slants backward.

Referring now to the drawings, the reference character 10 generally designates the body of the vehicle having front doors 12 and rear doors 14. The outer portion of the body is curved and the outer panels of the doors are curved to conform to the shape of the body. The sides of the doors are beveled as at 16. The doors are suspended on the outer section of the middle stanchion 18 by standard type hinges 20. Of course, I can suspend one door on the stanchion 18 and the other door on the front posts 22 or rear portions 24 of the body depending on the type of door opening desired. The body is provided with a pivoted front stanchion 30, rear hinged posts or stanchion 32 and middle hinged posts 34 pivoted to stanchion 18. Rear posts can be held in raised or lowered position by any standard type means. All these pivoted parts can be lowered and removed from sight when the vehicle is to be converted into an open one. The front stanchions 30 are extended beyond the door opening at 36 and are provided with a groove 38 to receive a flange 40 on the sash frames later to be described. The front stanchions are also provided with vertical slots or channels 42 for receiving a vertical windshield 44. I have also shown in Fig. 23 a slanting windshield.

The lower ends of the front stanchions 30 terminate in disks 46, 48 which are pivotally mounted on a pintle or rod 50. The windshield 44 when in lowered position actuates mechanism for releasing the stanchions. See Figs. 16, 17 and 19. One of the disks 46 is provided with a notch 52 for receiving the upper end of slidable member 54 slidably mounted on pins 56 by means of the slot 58. The lower portion of member 54 has projecting part 60 resiliently pulled upwardly by spring 62. This projecting part is in the path of windshield 44 and as the windshield moves downwardly in being lowered, member 54 is moved downwardly and the upper end thereof is removed from notch 52 and front stanchions may then be folded down. The body 10 is provided with channels 64 (Fig. 20) to receive the lowered front stanchions.

Each middle stanchion is provided with a cut away portion 70 for receiving the middle hinged post 34. The middle post is pivoted on a rod or pintle 72 to the upper portion of middle stanchion 18, and terminates in spaced disks 74 and 76. A slot or groove 78 is provided in the post to receive latching member 80 which includes a disk 82 having a resilient strip 84 forced up therefrom and arm 86. The middle stanchion has spaced disk members 88 and 90 for receiving pintle 72. Member 88 is provided with a resilient arcuate member 94 secured at one end 96 and having a projection 98 at its other end. Projection 98 is adapted to be forced into slot 100 on disk 74 by the resilient strip 84 on latching member 80 to hold the middle stanchion in raised position. The outer portion of middle post 34 is provided with raised portion or projection 102 (see Fig. 2) to fill the space between the sash frames and to provide a securing means for a third hinge 110. Positioned near the top of each middle post is the third hinge member 110 which is slidably mounted in passage 112. Hinge member 110 has a handle 114 and a short rod or pintle 116, and a guiding member 118 slidably received in groove 120. See Figs. 3 and 6.

The doors at their sides have flanges 130 which are adapted to be received by grooves 132 formed in the body so that the flanges are flush with the rest of the body and form a seal therewith.

The door construction is the same for all doors and will now be described in connection with front door 12. Each door construction is provided with a lower portion 134 and a sash frame 136 comprising a rectangular frame portion which is hinged to door 12 on rod or axle 140 so that the frame can be rotated and moved to concealed position in a rectangular chamber 142 formed in the inner wall of the door 12. Sash frame 136 is provided with flange portions 40, the front flange portion being received by channel 38 in the front stanchion and the rear flange portion cooperating with the projection 102 on middle post 34. The rear flange portion of the front sash frame has an eye member 144 projecting therefrom which is adapted to receive the pintle 116 on the third hinge member 110 to form additional support therefor. It is to be noted that the front portion 146 of the sash frame is set back from the door 12 in order to provide a sash frame which is smaller than the lower portion of the door. (See Fig. 7.) The sash frame is provided with a groove 148 for the window 150 (see Fig. 2). The groove may be provided with any lining desired. The lower ends of the sash frame terminate in flat disks 152 and 154 which are rotatably mounted on rod 140. The disks are tapered so that the bottom portion 158 of each disk is slightly thicker than the rest of the disk. The door 12 is slotted as at 160 to receive the disks 152 and 154 of the sash frame 136. The slots have inclined sides which are closer at the bottom as at 161 so as to cooperate with the disks 152 and 154 and assist in the raising and lowering of the sash frame 136 (see Fig. 9). The sides of the slot are not parallel but at the point 161 are closer together and due to the relatively tight construction the parts form retarding means for a portion of the movement of the sash frame 136. Due to this constricted portion the operator has to exert more force on the sash frame 136 in raising and also in lowering the frame so as to cause the frame to snap into upper or lower complete extended position. For locking the sash frame in raised position a slidable bolt 162 is provided in the door which is adapted to be received in opening 163 in the arm of sash frame 136. The slidable bolt is placed in a depression 164 in order to be out of the way of lower horizontal arm 165 of the sash frame when the sash frame is moved to lowered position. (See Figs. 1, 3 and 8). The rod or axle 140 is adjustable and holds the parts tightly so that the sash frame is held in any position and does not fall down and comprises the rod or axle 140 having threaded ends 170 received in the internally threaded sleeve 172 having kerf 174. A lock nut 176 is provided adjacent the sleeve 172 and abuts a portion of the door as shown in Fig. 8. By this construction it is possible to move the disks on the sash frame and change the amount of tension applied to the sash frame so that it may be harder or easier to move the sash frame to its various positions.

The door 12 comprises the outer panel 178, inner panel 180 and intermediate spaced plates 182 and 184. The plate 182 is secured to the inner panel 180 by bent portion 186 and screw 188 (see Figs. 10 and 15) at its upper end. At its lower end the plate 182 is secured to indented portion 190 of panel 180 by screw 192 and spacer means 194. Plate 184 is rigidly secured to plate 182 in any manner. The window in lowered position is between outer panel 178 and intermediate plates 182 and 184. The inner panel 180 is provided with the chamber 142 for receiving the sash frame comprising horizontal channels 198 and vertical channels 200. In this way standard thickness of the doors is maintained and the sash frame is hidden from view. With this construction the present standard window regulator can still be used. It is to be understood that before the sash frame 136 is lowered, it is necessary to lower the window 150 of the door. A cover or pocket flap 202 is provided for bottom horizontal channel 198 for safely securing the frame 136 in lowered position. Another flap 204 is provided for the top horizontal channel. The attaching means 206 for the covers or flaps 202, may be of conventional type. The attaching means 207 for the flap of the top horizontal channel comprises snaps 208 which do not interfere with the downward movement of horizontal arm 165 of the sash frame. The front post 22 and rear portion 24 are provided with projecting guard members 210, 212, adapted to protect and cover the sides of the lowered sash frames when the doors are closed.

The means for lowering and raising the window and for locking the sash frame 136 in raised position until the window is completely lowered will now be described. The intermediate plates 182 and 184 are adapted to carry the means for operating the window of the door. The window is mounted in a frame comprising U-shaped horizontal elongated members 214 having linings 216. These members 214 are carried by a channel member 218 having a flanged opening 220. The member 218 receives rollers 222 rotatably mounted on the ends of gear arms 224 on meshing gears 226. These rollers 222 are held within the channel member 224 by the flanges on opening 220 and are adapted to move within the channel to raise or lower the window 150 when the gear arms 224 are raised or lowered by rotating gears 226. The gears are rotatably mounted on intermediate plates 182 and 184. A handle member 230 having gear 234 is rotatably mounted in inner panel 180 and intermediate plates 182 and 184. The gear 234 is in mesh with one of the meshing gears 226 so that rotation of the gear 234 causes rotation of gears 226 and movement of gear arms 224 and consequent movement of the window 150.

Secured to the center and bottom of channel member 218 is a hook 236 which is adapted to cooperate with a pivotally mounted hook member 238 and a plurality of interconnected links to form a safety locking means for the sash frame 136. The hook member 238 is substantially U-shaped and has a shoulder 240. Pivoted intermediate its ends and adjacent said hook member 238 is a link 244 having a hook portion 246 at one end adapted to cooperate with hook 236 and hook member 238 to securely hold the parts when the window is in lowered position. When the hook 236 is down as in Figs. 9 and 13, hook portion 246 of link 244 abuts the shoulder 240 on hook member 238 to lock the parts in this position against accidental removal so that window 150 can not be moved while sash frame 136 is not in the correct position to receive the window. At its other end the link 244 has a pin 248 which is received in the slotted end 250 of another link 252 pivoted at 254 intermediate its ends. The other end of link 252 is also slotted to receive a pin 256 on vertically movable arm 258 which is substantially L-shaped in cross section, and has cut out portions 260. A spring 262 is attached at one end to stationary finger 263 and at its other end to link 252 in order to yieldingly assist in unlocking the hook members when it is desired to raise the window. The vertical arm 258 is guided in its movement by members 264. The cut out portions 260 are adapted to fit over guide members 264 to facilitate assembly. The arm 258 is provided with a square upper end 268 adapted to be received by a shoulder 270 formed in cam disk 272 secured to disk 152 on the lower end of sash frame 136. When the window is in completely lowered position the hook 236 is lowered and forces hook portion 246 of link 244 down. This movement actuates link 252 due to the interconnections of the links and pulls arm 258 downwardly to remove end 268 from shoulder 270 in cam disk 272 and thereby unlock the sash frame so that the sash frame 136 may be rotated and moved into concealed position.

A sash frame lock is provided to hold the frame in raised or lowered position so that it tends to remain in such position unless the latch is released. This sash frame lock comprises the disk 154 (Fig. 14) formed with two counter-sunk openings 276 adapted to receive the rounded head of latch rod 278. The rod 278 is mounted in a sleeve 280 within the door 12 and is surrounded by a coiled spring 282. At one end the spring abuts the sleeve 280 and at its other end abuts the rounded head of rod 278 to urge the rod against the disk 154 and into the openings. This construction locks the sash frame automatically and holds it firmly when it is in either completely raised or lowered positions.

A further safety device comprises the cam portion 290 on disk 154 which is adapted to cooperate with the flat bent spring 292 attached to the door 12 at 294. If the operator has failed to raise the sash frame to the regular raised position, the spring 292 automatically moves the sash frame to correct position so that the doors will interlock properly when closed. In addition to this safety device the tapered disks and the tapered slots assist in causing the sash frame to assume vertical raised and lowered positions.

In Fig. 23 I have shown a slanting windshield construction. The operating mechanism is substantially the same as that described in connection with the vertical windshield but the operating mechanism is placed at an angle to take care of the slant of the windshield. An inclined stanchion or post 300 is provided having a slot 302 to receive windshield 304. Post 300 is pivotally mounted on hinge 306. The hinge 306 is so formed that the post 300 while at an angle in vertical position will be at right angles to the door 12 or, in other words, parallel with the cowl as, for example, as shown at 30 in the form of the invention in Fig. 1, when the post 309 is in lowered position. The front side of the front door 308 is cut at an angle to provide a slanting side 310 to cooperate with the inclined or slanting stanchion 300 and close the space when the front door is closed. In the constructions having the slidable windshields the instruments from the instrument board are placed on the steering wheel which is formed to receive them.

The operation will now be described. When it is desired to transform the vehicle into an open one, it is first necessary to completely lower the window 150 so that hook 236 forces hook member 238 down and member 238 being connected to vertical arm 258 by the links 244 and 252 causes downward movement of square end 268 and removal thereof from the pocket 270 in the cam disk 272. It is then necessary to move the slidable bolts 162 toward the back to unlock the sash frame. The sash frame 136 is lowered into chamber 142 and flaps 202, 204 are drawn over horizontal channels 198 of the chamber. When the door is closed, guard members 210 and 212 cover the rest of chamber 142 to conceal other parts of the sash frame. Likewise, when the windshield is lowered it is necessary to completely lower the windshield glass to operate mechanism for releasing stanchions or posts 30 or slanting posts 300.

From the above description it will be apparent that I have disclosed relatively simple constructions which are compact and practical and which provide convertible open car and closed car bodies for vehicles.

In my copending application on Vehicle body construction, Serial No. 686,868, filed August 26, 1933, I have a disclosure of a vehicle body construction including some subject matter common to the subject matter in the present application which is not claimed herein but which is claimed in said copending application Serial No. 686,868, and which is directed to means for facilitating raising and lowering the sash frames and means for locking the sash frames when the windows are not completely down.

What I claim is:

1. A vehicle body construction, including, in combination, a door having a pivoted sash frame, said sash frame near its upper end being provided with an eye member, a pivoted stanchion or post on said body construction, a movable hinge member on said stanchion or post and adapted to be received by said eye member on said sash frame when said sash frame is in raised position.

2. A vehicle body construction, including, in combination, a door having a pivoted sash frame, said sash frame near its upper end being provided with an eye member, a pivoted stanchion or post on said body construction, a movable hinge member on said stanchion or post and adapted to be received by said eye member on said sash frame when said sash frame is in raised position and means for locking said stanchion or post in raised position.

3. A vehicle body construction, including, in combination, a door having a pivoted sash frame, said sash frame being provided with an eye member, a pivoted stanchion or post having a movable hinge, said hinge member being adapted to be received by the eye member when said sash frame and said stanchion or post are in lowered position to securely hold the said sash frame.

4. A vehicle body construction, including, in combination, a plurality of doors having pivoted sash frames, each sash frame having an eye member, a pivotally mounted stanchion or post between said sash frames, a hinge slidably mounted on said stanchion or post and having a pintle adapted to be received by said eye members, said stanchion or post having a projection extending between said sash frames to close the space therebetween.

5. A vehicle body construction, including, in combination, a slidably mounted windshield, means for raising or lowering said windshield, pivoted stanchions or posts to slidably receive said windshield, means for locking said stanchions or posts when said windshield is in raised position, said body construction being provided with channels to receive said stanchions or posts in lowered position and when the windshield is in lowered position so as to remove them from sight.

6. A vehicle body construction, including, in combination, a slidably mounted windshield arranged at an angle, means for raising or lowering said windshield, said body construction being provided with guideways arranged at an angle to slidably receive said windshield, pivoted posts arranged at an angle for said windshield, and means for locking said posts when said windshield is not in completely lowered position.

7. A vehicle body construction, including, in combination, a windshield arranged at an angle, means for raising or lowering said windshield, said body construction being provided with guideways arranged at an angle to slidably receive said windshield, pivoted posts arranged at an angle for said windshield, means for locking said posts when said windshield is not in completely lowered position, said body construction being provided with channels to receive said posts in lowered position.

8. A vehicle body construction, including, in combination, a door having a pivoted sash frame, said sash frame near its upper end being provided with an eye member, a pivoted stanchion or post, a movable hinge member on said stanchion or post and adapted to be received by said eye member when said sash frame is in raised position and means for locking said stanchion or post in raised position, said means including a pivoted latching member and a slot on said stanchion or post to receive said latching member.

9. A vehicle body construction, including, in combination, a windshield arranged at an angle, means for raising or lowering said windshield, said body construction being provided with guideways arranged at an angle to receive said windshield, pivoted posts arranged at an angle for said windshield, means for locking said posts when said windshield is not in completely lowered position, said body construction being provided with channels to receive said posts in lowered position, said channels being substantially parallel to a cowl of the body construction.

10. A vehicle body construction, including, in combination, a windshield, means for raising or lowering said windshield, pivoted stanchions or posts for said windshield, means for locking said stanchions or posts when said windshield is in raised position, said body construction being provided with channels to receive said stanchions or posts in lowered position so as to remove them from sight, and means whereby said stanchions or posts are released when said windshield is in completely lowered position.

11. A vehicle body construction, including, in combination, a door having a pivoted sash frame, said sash frame near its upper end being provided with an eye member, a stanchion or post adjacent said door and sash frame, a hinge on said stanchion or post and adapted to be received by said eye member when said sash frame is in raised position, said hinge and eye member being relatively movable.

12. A vehicle body construction, including, in combination, a windshield arranged at an angle, means for raising or lowering said windshield, said body construction being provided with guideways arranged at an angle to slidably receive said windshield, pivoted posts arranged at an angle for receiving said windshield, said body construction being provided with channels to receive said posts in lowered position, said channels being substantially parallel to a cowl of the body construction.

13. A vehicle body construction, including, in combination, a plurality of doors having pivoted sash frames, each sash frame having an eye member, a pivotally mounted stanchion or post between said sash frames, a hinge slidably mounted on said stanchion or post and having a pintle adapted to be received by said eye members on said sash frames.

14. A vehicle body construction, including, in combination, a plurality of doors provided with pivoted sash frames, one of said sash frames having an eye member adjacent its upper edge when in raised position, a pivotally mounted stanchion or post between said sash frames, and a hinge slidably mounted on said stanchion or post and having a pintle adapted to be received by said eye member on said sash frame.

THRASYBULE D. LAZARIDES.